2,363,580

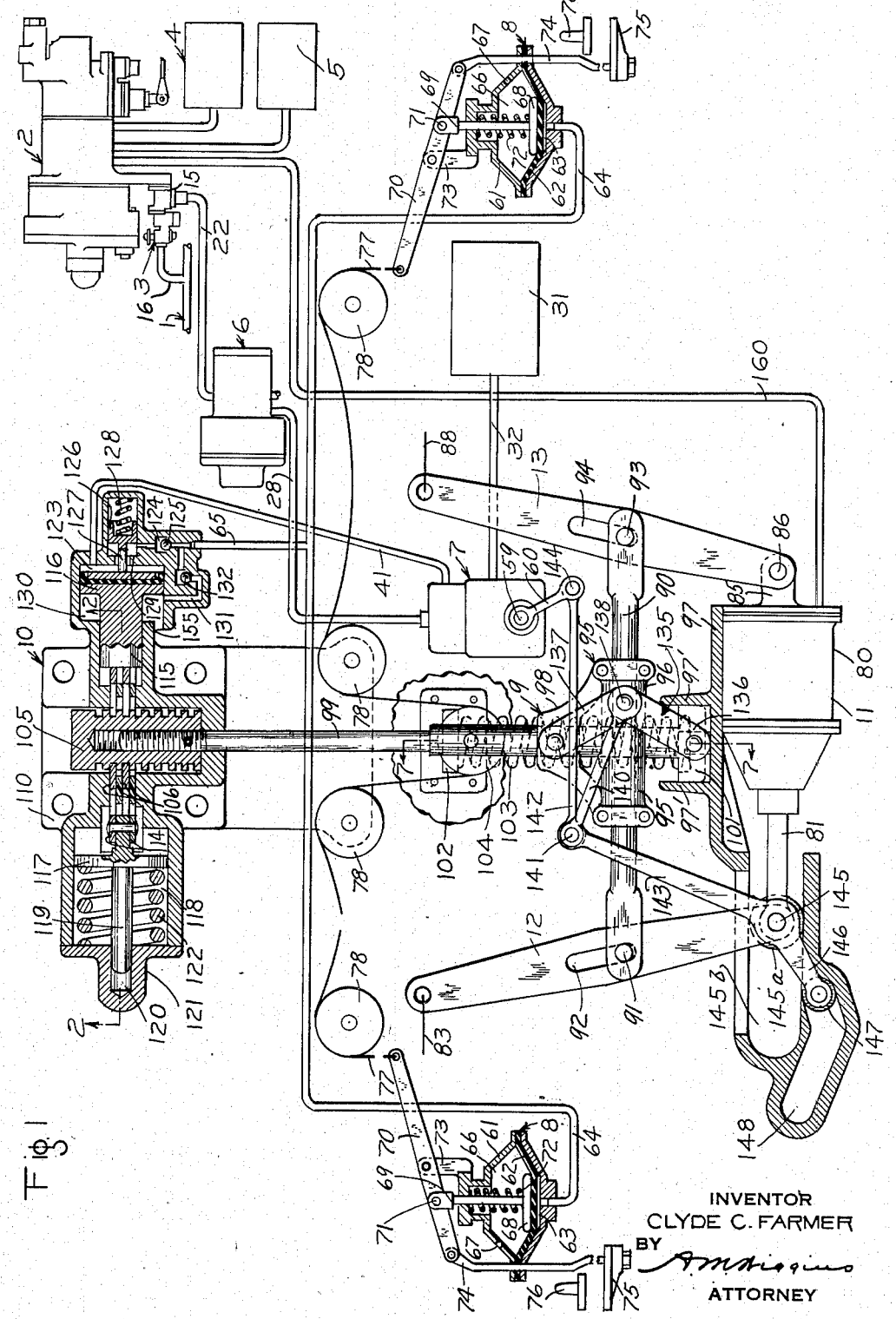
Nov. 28, 1944. C. C. FARMER 2,363,580
VARIABLE LOAD BRAKE
Filed July 30, 1942  3 Sheets-Sheet 1
INVENTOR
CLYDE C. FARMER
BY
ATTORNEY

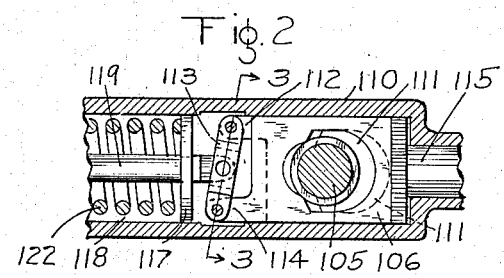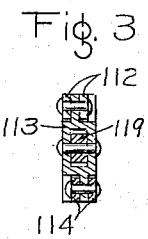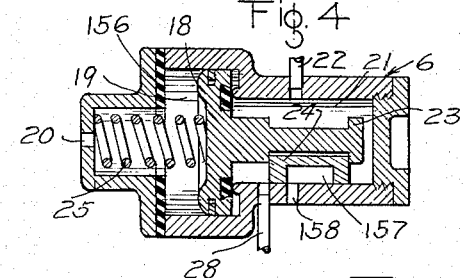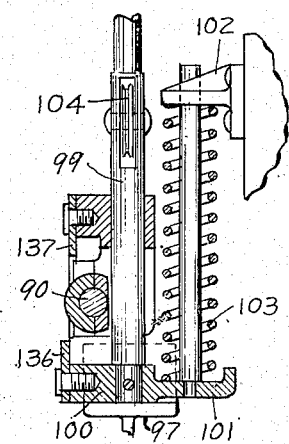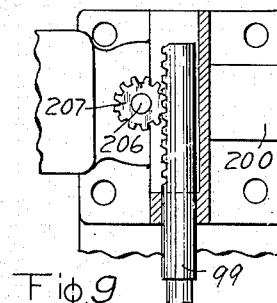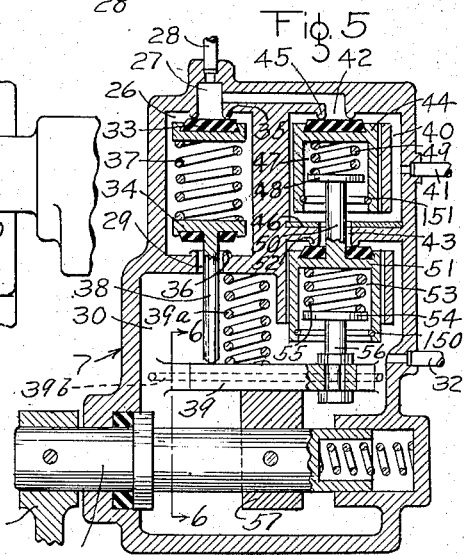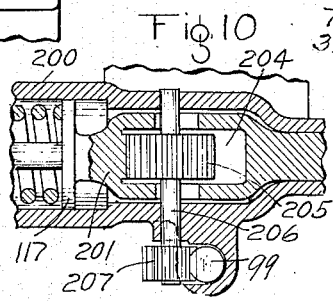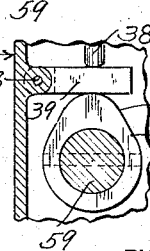
INVENTOR
CLYDE C. FARMER
BY
ATTORNEY Nov. 28, 1944.  C. C. FARMER  2,363,580
VARIABLE LOAD BRAKE
Filed July 30, 1942  3 Sheets-Sheet 3
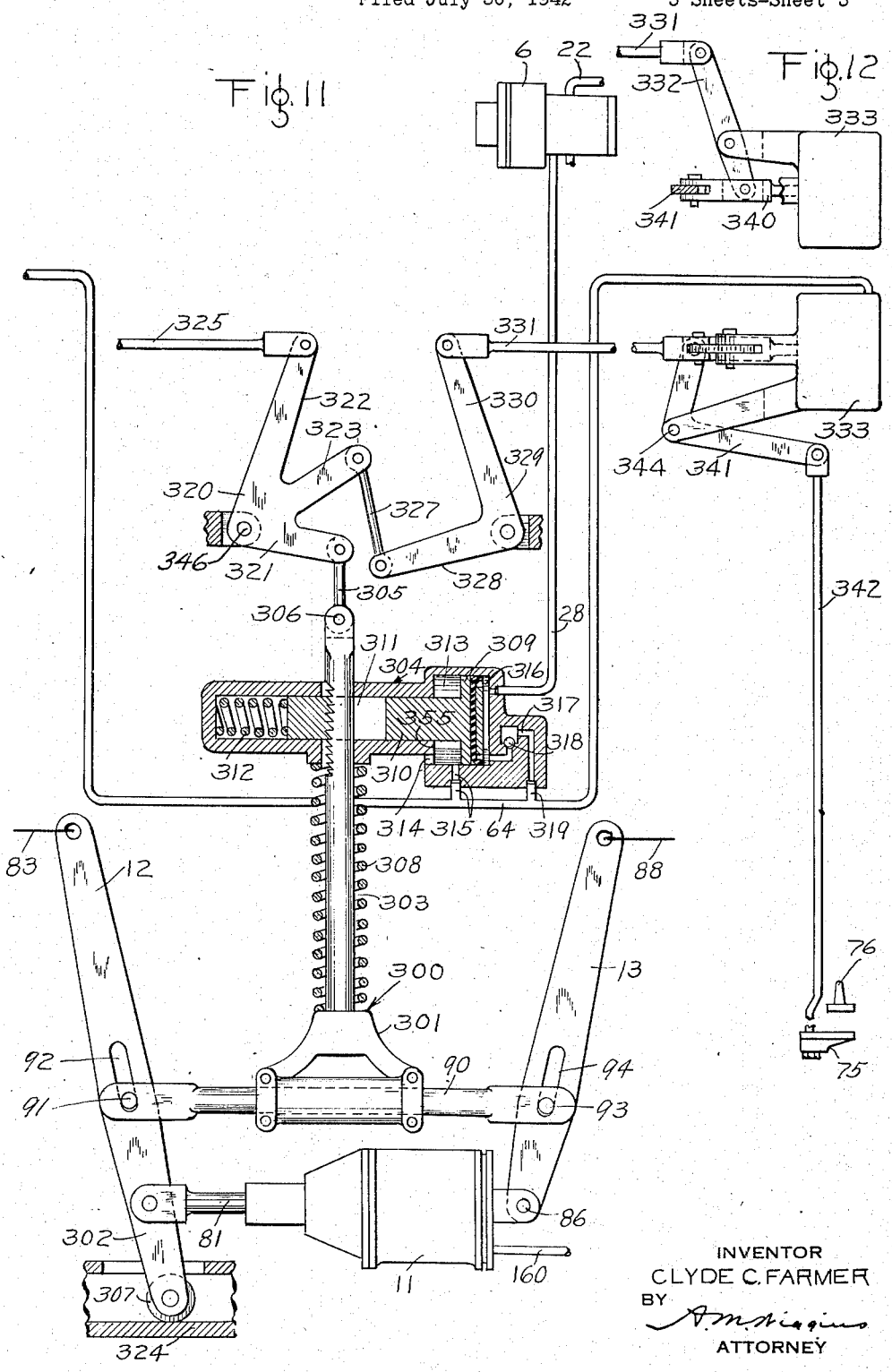
INVENTOR
CLYDE C. FARMER
BY
*A. M. Higgins*
ATTORNEY Patented Nov. 28, 1944

UNITED STATES PATENT OFFICE 2,363,580

VARIABLE LOAD BRAKE

Clyde C. Farmer, Pittsburgh, Pa., assignor to The Westinghouse Air Brake Company, Wilmerding, Pa., a corporation of Pennsylvania Application July 30, 1942, Serial No. 452,853

25 Claims. (Cl. 188—195)

This invention relates to variable load brake apparatus for railway vehicles and more particularly to that type of apparatus in which the leverage thereof may be automatically varied in accordance with variations in the weight of the load on the vehicle to correspondingly vary the force with which the brake is adapted to be applied.

An object of the invention is to provide an improved variable load brake apparatus of the above mentioned type.

Another object of the invention is to provide a variable load brake apparatus of the above mentioned type with an arrangement whereby the adjustment of the apparatus for load braking will not act to increase the travel of the brake cylinder piston over that required for empty braking.

A further object of the invention is to provide a variable load brake rigging of the above type which is so constructed and arranged that, when the brake pipe pressure is being increased in charging, it will be automatically conditioned or changed over for either empty or load braking, depending upon the weight carried by the body of the vehicle, and which, when the brake pipe pressure exceeds a predetermined limit, will be maintained and locked in its conditioned state so long as the brake pipe pressure is not reduced below said predetermined limit. A further feature resides in the automatically operative means employed for positively locking the apparatus in any of its conditioned positions against accidental movement therefrom and for automatically unlocking the apparatus to permit its intentional operation from one of its conditioned positions to another.

Other objects and advantages will appear in the following detailed description of the invention.

In the accompanying drawings

Fig. 1 is a diagrammatic view, partly in section, of a variable load brake apparatus constructed in accordance with the invention.

Fig. 2 is a fragmentary sectional view taken on the line 2—2 of the locking mechanism shown in Fig. 1, Fig. 3 is a cross-sectional view taken on the line 3—3 of Fig. 2, Fig. 4 is an enlarged sectional view of the change-over control valve device shown in outline in Fig. 1, Fig. 5 is an enlarged sectional view of the pilot valve device shown in outline in Fig. 1, Fig. 6 is a fragmentary sectional view taken on the line 6—6 of Fig. 5, Fig. 7 is a fragmentary sectional view taken on the line 7—7 of the adjusting mechanism shown in Fig. 1, Fig. 8 is a fragmentary sectional view of a different locking mechanism which may be substituted for the locking mechanism shown in Fig. 1, Fig. 9 is a horizontal sectional view of the locking mechanism shown in Fig. 8, Fig. 10 is a fragmentary sectional view taken on the line 10—10 of Fig. 9, Fig. 11 is a diagrammatic view partly in section of a variable load brake apparatus embodying another form of the invention, and Fig. 12 is a plan view of the weighing device shown in Fig. 11.

As shown in Fig. 1 of the accompanying drawings, the variable load fluid pressure brake apparatus may comprise a brake pipe 1, a brake controlling valve device 2, a combined cutout cock and centrifugal dirt collector 3, an auxiliary reservoir 4, an emergency reservoir 5, a change-over control valve device 6, a pilot valve device 7, two weighing mechanisms 8, one of which is disposed at each end of the vehicle, an adjusting mechanism 9, a locking mechanism 10, a brake cylinder 11 and a pair of cylinder levers 12 and 13, the lever 12 being a live lever and the lever 13 being a dead lever.

The brake controlling valve device 2 shown is of the "AB" type but may be of any other desired type. This mechanism may be of substantially the same construction and have the same operating characteristics as the "AB" valve device fully described in the patent to Clyde C. Farmer No. 2,031,213, issued February 18, 1936, and in view of this it is deemed unnecessary to show and describe the device in detail. It will of course be understood that this mechanism operates upon a service reduction in brake pipe pressure to supply fluid under pressure to effect a service application of the brakes, upon an emergency reduction in brake pipe pressure to supply fluid under pressure to effect an emergency application of the brakes, and upon an increase in brake pipe pressure to effect a release of the brakes and the charging of the brake equipment.

The combined cut-out cock and centrifugal dirt collector 3 is of the usual well known construction and for this reason it is deemed unnecessary to show and describe the device in detail.

Clamped between the casing of the brake controlling valve device 2 and the combined cut-out cock and centrifugal dirt collector device 3 is a filler piece 15 which, at one end, registers with the outlet passage of the device 3 and, at the other end, with the brake pipe passage of the brake controlling valve device 2, which brake pipe passage, as is well known, is in constant open communication with the usual piston chambers (not shown) of the service and emergency portions of the device 2.

The inlet passage of the device 3 is connected by a branch pipe 16 to the brake pipe 1, which passage is normally open to the outlet passage, but which is adapted to be closed through the medium of the usual rotatable cut-out plug valve, not shown.

The change-over control valve device 6 may comprise a casing in which there is slidably mounted a piston 18. At one side of this piston there is a chamber 19 which is constantly connected through a passage 20 with the atmosphere. At the opposite side of the piston there is a valve chamber 21 which is constantly connected through a passage and pipe 22 to the side outlet of the filler piece 15.

Contained in valve chamber 21 is a slide valve 24 which is adapted to be operated by a piston stem 23 carried by the piston 18. Contained in chamber 19 and acting on the piston is a spring 25 which, at all times, is arranged to urge the piston, piston stem and slide valve toward the position in which they are shown in Fig. 4 of the drawings.

The pilot valve device 7, comprises a casing having a chamber 26 which is open at one end, by way of a passage 27, to a pipe 28 leading to the seat for the slide valve 24 in the change-over control valve device 6, and which is open at the opposite end, by way of a passage 29, to a chamber 30. The chamber 30 is in constant open communication with a volume reservoir 31 by way of a pipe 32.

Contained in chamber 26 is a pair of valves 33, 34. The valve 33 is adapted to seat on an annular seat rib 35, surrounding the passage 27, to cut off communication between said passage and the chamber. The valve 34 is adapted to seat on an annular seat rib 36, surrounding the passage 29, to cut off communication between chambers 26 and 30. Also contained in chamber 26 and interposed between and operatively engaging the valves 33 and 34 is a spring 37.

The valve 34 is provided with a stem 38 which extends through the passage 29 into the chamber 30 and at its outer end engages an operating member 39 which is hinged to the casing by means of a pin 39b, as best shown in Fig. 6 of the drawings.

The casing of the pilot valve device 7 is also provided with a chamber 40 which is connected to the locking mechanism 10 by way of a pipe 41. The chamber 40 is connected at one end to a passage 42 which is connected to the passage 27. The chamber is connected at the opposite end to a passage 43 leading to the chamber 30.

Contained in chamber 40 is a valve piston 44 which at one end is adapted to seat on an annular seat rib 45, surrounding the passage 42, to cut off communication between chamber 40 and passage 42. At the opposite end, this valve piston is adapted to engage a sealing gasket 46, surrounding the passage 43 and carried by the casing, to cut off communication between chambers 40 and 30. This valve piston is provided with a bore 47 containing a spring seat 48. Interposed between and operatively engaging said spring seat and the closed end of the bore is a spring 49.

The spring seat 48 is provided with a stem 50 which extends through the passage 43 into the chamber 30, which stem is rigidly connected to a valve piston 51 constructed and arranged to engage a seat rib 52 surrounding the passage 43 within chamber 40.

The valve piston 51 is provided with a bore 53 having slidably mounted therein a spring seat 54. Interposed between and operatively engaging the spring seat 54 and the closed end of the bore is a spring 55. The spring seat 54 is provided with a stem 56 which extends to the exterior of the bore 53 and is connected at its outer end in any suitable manner to the operating member 39.

For the purpose of controlling the operation of the operating member 39, a rotatable cam 57 is provided having a peripheral cam face 58 adapted to operatively engage the lower surface of the member.

The cam 57 is secured to an operating shaft 59 which is rotatably mounted in the casing and secured to the outer end of this shaft exteriorly of the casing is an operating lever 60.

It will here be noted that a spring 39a is interposed between the upper surface of the operating member 39 and the upper wall of the chamber 30 and is operative, at all times, to urge the member into engagement with the cam face 58.

The weighing mechanism may comprise at each end of the vehicle an actuating device 61 which is rigidly secured in any suitable manner to a spring supported part such for instance as the body bolster or any other suitable part of the vehicle body. The device comprises a two-piece casing having clamped therebetween a diaphragm 62. At one side of the diaphragm is a chamber 63 which is in constant open communication with a pipe 64 extending from the device at one end of the vehicle to the device at the opposite end of the vehicle, which pipe in turn is connected to the locking mechanism 10 by means of a pipe 65. At the opposite side of the diaphragm 62 in each device there is a chamber 66 which is in constant open communication with the atmosphere by way of a passage 67.

Contained in each chamber 66 there is a diaphragm follower 68 having a stem 69 which extends to the exterior of the casing and which, at its outer end, is connected to a lever 70 by means of a pin 71. Also contained in each chamber 66 and interposed between and operatively engaging the diaphragm follower 68 and the inner wall of the chamber is a spring 72.

The lever 70 at each end of the vehicle is rockably mounted intermediate its ends on a pin mounted in a bracket 73 carried by the casing. One end of the lever 70 is connected to a rod 74 which is provided with a foot portion 75 which portion is adapted to be moved into engagement with a stop member 76 carried by a fixed or unsprung part of the vehicle such for instance as the truck frame. The foot portion 75 and stop member 76 are so arranged that when the vehicle is empty there will be a clearance space between them which will be sufficient to permit the usual vertical vibrations of the body relative to the truck frame and vehicle wheels without danger of their engagement with each other thus relieving the mechanism of damaging forces which might otherwise be transmitted thereto. The opposite end of the lever 70 is connected to one end of a cable 77, which cable passes over a plurality of pulleys 78 mounted on the body of the vehicle. It will be noted that since the foot portion 75 is supported by a spring supported part of the vehicle and the stop member 76 is supported by an unsprung part, the clearance between the foot 75 and stop member 76 being variable according to variations in the weight of the load carried by the body, the minimum clearance being attained with the vehicle empty and the maximum clearance with the vehicle fully loaded.

The brake cylinder 11 is of the usual well known type having a cylinder 80 which is rigidly secured to the underside of the vehicle body and which contains the usual piston (not shown) having a push rod 81 which projects beyond one end of the cylinder. The outer end of the push rod 81 is operatively connected to the one end of the horizontally disposed live or floating brake cylinder lever 12, the other end of the lever being operatively connected with a pull rod 83 leading to other brake rigging elements, not shown. Formed on the cylinder 80 is a lug 85, which carries a pin 86 upon which one end of the dead brake cylinder lever 13 is pivotally mounted. The other end of the lever 13 is connected to a pull rod 88, which may be connected in the usual manner to other members of the brake rigging.

The levers 12 and 13 are operatively connected together intermediate their ends by a rod 90.

The rod 90 is operatively connected to the live cylinder lever 12 by means of a fulcrum pin 91 which is arranged to slide within a longitudinal slot 92 formed in the lever 12. The opposite end of the rod 90 is operatively connected to the dead cylinder lever 13 by means of a pin 93, which is arranged to slide within a longitudinal slot 94 formed in the lever 13.

It is obvious that any variation in the position of the pins 91 and 93 with relation to the levers 12 and 13 respectively, will result in a variation in the leverage of the apparatus and thereby a variation in the braking power of the brake rigging.

If the pin 91 is moved longitudinally in a direction away from the brake cylinder push rod 81 the arm of the lever 12 to which the push rod is connected, will be correspondingly lengthened, so that when the brake cylinder device is operated the power transmitted by the opposite or outer end of the lever to the pull rod 83 will be correspondingly increased. If the pin is moved from the outer end of the slot in a direction toward the push rod 81 the power transmitted to the pull rod will be decreased.

It is also obvious that if the pin 93 at the opposite end of the rod 90 is moved outwardly in a direction away from the brake cylinder 11 the power transmitted by the outer end of the cylinder lever 13 to the pull rod 88 will be correspondingly increased. If the pin is moved inwardly from its outer position the power transmitted to the pull rod will be decreased.

It will be understood that the braking force may be varied by shifting the rod 90 and pins 91 and 93 relative to the levers 12 and 13 without increasing brake cylinder piston travel. The slots 92 and 94 are so arranged that the travel of the brake cylinder push rod will be the same regardless of the positions of the pins 91 and 93 with relation to the cylinder levers. Thus, it will be seen that the braking force of the rigging may be varied without necessarily varying the pressure of fluid in the brake cylinder.

For shifting the rod 90 relative to the brake cylinder levers 12 and 13 so as to provide a higher leverage ratio for a loaded car than for an empty car, the adjusting mechanism 9 is provided.

The adjusting mechanism 9 may comprise a horizontally movable member 95 having a tubular sleeve portion 96 in which the rod 90 is slidably mounted and also having a horizontally extending sleeve portion 98 through which a horizontally extending rod 99 passes, the portion 98 serving to support the rod in its horizontal position. The member 95 is also provided with a base portion 100 to which the inner end of rod 99 is rigidly secured, which base portion 100 is provided with a spring seat 101 and is slidably guided horizontally by spaced lugs 97' carried by and extending outwardly from a brake cylinder supporting member 97 rigidly carried by the vehicle body. Interposed between and operatively engaging the spring seat 101 and a bracket 102 rigidly carried by the vehicle body is a spring 103, which is held in place by a horizontally disposed rod which rod, at its inner end, is supported by and secured to the spring seat 101, and which, at its outer end is slidably guided in the bracket 102.

Suitably journaled on a pin carried by the horizontally extending rod 99 is a pulley 104 under which passes the cable 77 which as hereinbefore mentioned is connected at each end of the vehicle at one end of the lever 70 constituting a part of the weighing mechanism 8.

The rod 99 has screw-threaded connection at its outer end with a tubular member 105 having teeth which are adapted to be engaged by locking plates or pawls 106 comprising a part of the locking mechanism 10.

The locking mechanism 10 comprises a casing 110 which is rigidly secured to the vehicle body in any suitable manner, and slidably mounted in said casing are four of the locking plates or pawls 106 just referred to. Each plate or pawl 106 is provided with an opening 111, as best shown in Fig. 2, through which the tooth portion of the tubular member 105 connected to the rod 99 extends. Two of the plates or pawls 106 are provided at one end with lugs 112 which are connected to one end of an actuating lever 113. The other two plates or pawls 106 are provided at the same end with lugs 114 which are connected to the opposite end of the actuating lever 113. The plates 106 at their opposite end are arranged to be engaged by the end of a push rod 115 carried by a piston 116.

The actuating lever 113 is connected intermediate its ends to one end of a plunger or push rod 119 having a spring seat or collar 117 which is slidably mounted in a cylinder bore 118 in the casing. The opposite end of the plunger is slidably guided in a bore 120 provided in a cover portion 121 of the casing. Surrounding the plunger and interposed between and operatively engaging the spring seat 117 and the cover portion 121 is a spring 122, which, as will hereinafter appear, acts to move the plates or pawls 106 into locking engagement with the toothed portion of the tubular member 105 on the rod 99.

The piston 116 has at one side thereof a chamber 123 which is connected to the pipe 41 leading to the pilot valve device 7. The pipe 65 leading from pipe 64 is connected to this chamber by way of a passage 124 containing a ball check valve 125 which prevents flow of fluid from chambers 123 to the pipe 65. Contained in chamber 123 is a valve 126 having a stem 127. The outer end of this valve stem is adapted to be engaged by the outer face of the piston 116. Interposed between and operatively engaging the back of the valve 126 and the inner wall of the chamber 123 is a spring 128 which, at all times, tends to move the valve into engagement with a valve seat 129.

At the opposite side of the piston 116 there is a chamber 130 which is connected by way of a passage 131, containing a ball check valve 132, to the passage 124 at a point located intermediate the ball check valve 125 and the pipe 65.

In brake apparatus it is essential that sufficient clearance be provided between the friction braking surfaces of the brake elements as for instance between brake shoes and the treads of the vehicle wheels when the brakes are released to insure against any possibility of the elements engaging each other. It is desirable to take this clearance up quickly and without requiring an increase in brake cylinder piston travel when an application of the brakes is initiated. With the brake cylinder lever arrangement shown in which the leverage is varied according to the weight of the load carried by the vehicle by moving the pins 91 and 93 longitudinally of the levers the clearance between the braking elements must be greater than is provided with a brake in which the pins 91 and 93 are not adjustable. In order to provide the desired clearance and the rapid take-up of such clearance a toggle mechanism 135 is provided which may comprise a pair of levers 136 and 137, the adjacent ends of which are pivotally connected together by means of a pin 138. The opposite end of the lever 136 is pivotally connected to the base portion 100 of the member 95, while the opposite end of the lever 137 is pivotally connected to the sleeve portion 98 of the member 95.

The pin 138 in addition to connecting the adjacent ends of the levers 136 and 137 together also serves to connect these ends of the levers to one end of an actuating rod 140. The rod 140 at its opposite end is pivotally connected by means of a pin 141 to one end of a rod 142 and also to one end of a horizontally disposed lever 143. The rod 142 at its opposite end is connected by means of a pin 144 to the lever 60 which is secured to the operating shaft 59 of the pilot valve device 7.

The lever 143 is connected by means of a pin 145 to the outer end of the push rod 81, of the brake cylinder device and is provided with an arm 146 which is arranged to carry at its outer end a roller 147, which roller is adapted to travel in a tortuous path fixed by a guide slot 148 provided in a portion carried by the fixed brake cylinder supporting member or bracket 97.

The pin 145 is supported by a pair of rollers 145a which are rotatably mounted on the pin and which are arranged one on each side of the connection between the levers 12 and 143 and push rod 81, which rollers are, as shown in Fig. 1, guided by the member 97 within a slot 145b one of the rollers being omitted in this figure in order to more clearly illustrate said connection. The guide slot 145b insures movement of the connection between the push rod 81 and the levers 13 and 143 in a straight line.

*Operation*

Assuming the vehicle, embodying the invention, to be empty and separated from a train, the brakes on the vehicle released and the brake pipe of the vehicle deplete of fluid under pressure. Under these conditions the several parts of the equipment will be in the position illustrated in Fig. 1 of the drawings.

It should be mentioned, however, that with the brakes on the vehicle released the cam 57 of the pilot valve device 7 will not be in the position in which it is shown in Figs. 5 and 6, but will be in the position in which the high point on the cam surface 58 is out of engagement with the hinged member 39. With the cam 57 in this position the spring 39a acts to maintain the hinged member 39 tilted downwardly from the position in which it is shown, thus permitting the spring 37 to maintain the valve 34 in seating engagement with the seat rib 36. Further with the member 39 thus tilted the spring seat 54 rests on a stop ring 150 carried by the valve piston 51, the valve piston 51 being unseated and the associated spring seat 48 resting on a stop ring 151 carried by the valve piston 44. With the spring seat 48 engaging the stop ring 151 the valve piston 44 will be out of engagement with the seat rib 45 and in engagement with the sealing gasket 46.

Now, when the empty vehicle is placed in a train, the brake pipe 1 will of course be supplied with fluid under pressure, the brake pipe throughout the train being fully charged to the normal pressure carried before the train is put in motion. Fluid under pressure supplied to the brake pipe flows through the branch passage 16, the combined cut-out cock and centrifugal dirt collector 3 and filling piece 15 to the several chambers of the brake controlling valve device 2 which are to be charged and to the auxiliary and emergency reservoirs 4 and 5, respectively, in the usual manner.

Fluid under pressure flows from the side outlet passage in the filling piece 15 to slide valve chamber 21 in the change-over control valve device 6 by way of pipe 22. With the change-over control valve slide valve 24 in its innermost position, as shown in Fig. 4 of the drawings, fluid under pressure flows from the valve chamber 21 to pipe 28 from whence it flows to passages 27 and 42 in the pilot valve device 7. The change-over control piston and slide valve remain in this position until the pressure of fluid in valve chamber 21 has been increased sufficiently to cause the piston and slide valve to move outwardly against the opposing pressure of the spring 25. As will hereinafter more fully appear, an increase in the pressure of fluid in the valve chamber 21 to thirty pounds will cause the piston and slide valve to move as just described.

Fluid under pressure supplied to passage 42 flows past the unseated valve piston 44 to the chamber 40 from whence it flows to chamber 123 in the locking mechanism 10 by way of pipe 41. Fluid under pressure acting in chamber 123 causes the piston 116 and piston rod 115 thereof to move in a direction toward the left hand as viewed in Figs. 1 and 2 of the drawings. Since the outer end of the piston stem 115 engages the locking plates 106 movement of said piston and stem in a direction toward the left hand causes the plates 106 to move in the same direction against the opposing pressure of the spring 122. The locking plates are thus moved out of engagement with the toothed portion of the tubular member 105 on the rod 99, thereby unlocking the adjusting mechanism 9.

The piston 116 continues to move in this direction until brought to a stop by its engagement with a stop 155 carried by the casing. The piston when it is thus brought to a stop will have first covered the passage 131 cutting off the communication between the passage and chamber 130 and then uncovered the passage 131 thereby establishing a communication between the passage and the chamber 123.

With the passage 131 thus connected to chamber 123 fluid under pressure flows from this chamber by way of pipes 65 and 64 and past the check valve 132 to the chambers 63 of the devices 61 disposed at the ends of the vehicle.

It will here be noted that when the piston 116 is moved to the position to uncover passage 131 it will have moved out of engagement with the stem 127 thus permitting the spring 128 to move the valve 126 into engagement with its seat 129 to cut off communication between passage 124 and chamber 123.

Fluid under pressure supplied to each chamber 63 tends to flex the diaphragm 62 thereof outwardly from the position in which it is shown in Fig. 1 of the drawings, against the opposing pressure of the spring 72. Outward movement of each diaphragm causes each diaphragm follower 68 and attached stem 69 to move in the same direction. This movement of the stem 69 causes the lever 70 of each device to rock about its pivot pin until the foot 75 is moved into engagement with the fixed stop member 76. At the same time the opposite end of the lever 70, which is connected to the cable 77 acts to take up the slack in said cable.

Since the vehicle is empty the foot 75 will engage the stop 76 before the lever 70 will have rocked far enough to cause the cable to raise the rod 99, and the adjusting mechanism 9 will be maintained in the position in which it is shown in Fig. 1 of the drawings.

When the pressure of fluid in the valve chamber 21 of the change-over control valve device 6 has been increased to about thirty pounds the piston 18 will be caused to move inwardly against the opposing pressure of the spring 25 until brought to a stop by engagement with a gasket 156.

With the change-over piston 18 in this position the slide valve 24 will have moved into a position in which a cavity 157 therein connects the pipe 28 to an atmospheric passage 158. With this communication established fluid under pressure in chamber 123 is quickly vented to the atmosphere, by way of pipe 41, chamber 40 in the pilot valve device 7 past unseated valve piston 44, passage 42, pipe 29, cavity 157 in the change-over control valve slide valve 24 and atmospheric passage 158. Upon a reduction of pressure in chamber 123 due to this venting, the spring 122 acting through the medium of the spring seat 117, push rod 119 and actuating lever 113 moves the locking plates 106 and the piston 116 in a direction toward the right hand into locking engagement with the member 105 as shown in the drawings. With the plates thus positioned, the rod 99 and thereby the adjusting mechanism 9 is locked against accidental movement.

The piston 116 in its movement to this position will have engaged the stem 127 and moved the valve 126 to the position in which it is shown in Fig. 1 of the drawings. With the valve 126 thus positioned, fluid under pressure in chamber 63 of the weighing valve device 61 at each end of the vehicle will be vented to the atmosphere by way of pipes 64 and 65, passage 124, past ball check 125, past unseated valve 126, chamber 123 in the locking mechanism 10, pipe 41, chamber 40 in the pilot valve device 7, past unseated valve piston 44, passages 42 and 27, pipe 28, cavity 157 in the change-over control valve slide valve 24 and atmospheric passage 158.

Upon the release of fluid under pressure from the chambers 63 of the valve device 61 at each end of the vehicle the spring 72 in each device will act to move the diaphragm 62, diaphragm follower 68 and rod 69 downwardly and as a result the lever 70 will rock about its pivot pin, so that the foot 75 of the device at each end of the vehicle will be moved out of engagement with the stop 76 and thereby produce slack in the cable 77. When the diaphragm 62 and diaphragm follower 68 have been moved to the position in which they are shown in Fig. 1 of the drawings, the space or clearance between the foot 75 and the adjacent stop 76 will be such that they will not engage, due to the usual service vibrations and track inequalities, thus eliminating excessive and unnecessary wear or damage of the several parts of the mechanism.

With the brake controlling valve device 2 in its release position the brake cylinder 11 will be connected to the atmosphere by way of a pipe 160 and through the controlling valve device 2 in the usual manner, so that the brake cylinder piston or push rod 81 and, as a consequence, the toggle mechanism 135 will be maintained in the position in which they are shown in Fig. 1 of the drawings.

*Application of the brakes with the equipment conditioned for empty car operation*

When it is desired to effect an application of the brakes the pressure of fluid in the brake pipe 1 is reduced in the usual manner, causing the brake controlling valve device 2 to function to supply fluid under pressure from the auxiliary reservoir 4 to the pipe 160. Fluid under pressure thus supplied to the pipe 160 flows to the brake cylinder 11, causing the push rod 81 to move outwardly, that is toward the left, as viewed in Fig. 1 of the drawings. The push rod as it is thus moved causes the inner end of the brake cylinder lever 12, pin 145, guide rollers 145a and intermediate portion of the lever 143 to move in a straight line in the same direction, the engagement of the rollers with the walls of the slot insuring this straight line travel. The tortuous slot 148 is substantially V-shaped as viewed in Fig. 1 the right hand end of the slot being shorter than the left-hand end. As the pin 145 is moved by the push rod the roller 147 will travel along the right hand end of the slot 148, and due to the engagement of the roller with the walls of the slot, a slight rotary movement in a counter-clockwise direction will be imparted to the lever 143 at the same time as the lever moves bodily in the direction toward the left hand. As the lever 143 thus moves it pulls the rod 140 and 142 in the same direction, the rod 140 actuating the toggle arms or links 136 and 137 and the rod 142 actuating the arm 60 of the pilot valve device 7 in a clockwise direction.

The rod 140 as it is moved by the lever 143 causes the toggle arms or links 136 and 137 to be straightened, that is to say, to be brought into substantial alignment with each other, such straightening or alignment being accomplished when the push rod 81 has moved a distance of approximately three inches from the position in which it is shown in Fig. 1. At this time the roller 147 will have traversed the right hand end of the slot and will be about to enter the left hand end of the slot.

As the toggle links are being moved into alignment with each other as just described, they act to shift the member 95 outwardly along the rod 99, which rod at this time is maintained locked in a stationary position by the locking mechanism 10. The member 95 as it moves outwardly shifts the rod 90 in the same direction, which rod shifts the pins 91 and 93 a short distance along the slots 92 and 94, respectively, in the levers 12 and 13. The slots 92 and 94 in the levers 12 and 13, respectively are so arranged that the pins, as they are moved, tend to move the outer ends of the levers toward each other thereby actuating the pull rods 83 and 88 to actuate the brake rigging (not shown) to bring the usual brake shoes nearer the treads of the vehicle wheels.

It will here be noted that the limited movement of the push rod 81 thus far described causes the levers 12 and 13 to operate to also actuate the pull rods 83 and 88, but the movement of the levers due to the movement of the pins 91 and 93 and to the movement of the levers about the pins is insufficient to cause the brake shoes to engage the treads of the vehicle wheels, so that there will be no material braking forces acting to oppose the movement of the pins outwardly along the slots 92 and 94 respectively. As a consequence the mechanism will be free of excessive stresses which may tend to damage the mechanism.

As the brake cylinder piston continues to move the push rod 81 outwardly, i. e. toward the left hand, the roller 147 carried by the lever 143 enters the left hand end of the slot 148, the roller as it follows this end of the slot imparts a clockwise tilting movement of the lever about the pin 145 and since the pin is moving toward the left the outer end of the lever, pin 141 and ends of the rods 140 and 142 carried by the pin will move in a substantially straight line in a direction toward the brake cylinder at right angles to the path of travel of the push rod 81. The rods as they are thus moved may, if the manufacturing clearances between the associated parts are very close, cause the connected ends of the toggle links and the arm 60 of the pilot valve device 7 to move toward the right but such movement will be so slight that it will be negligible. From this it will be apparent that after the roller 147 enters the left hand end of the slot 148 the lever 143 will in no way cause a material operation of the toggle links and arm 60 even though the piston travel may be excessive.

The push rod, as it continues to move forwardly as just described, actuates the lever 12 and thereby the lever 13 in the usual manner to move the pull rods 83 and 88 to cause the brake shoes to frictionally engage the treads of the vehicle wheels.

It will here be noted that the initial movement of the push rod 81 and connected lever 143 will effect movement of the rod 142 in a direction toward the left hand thereby rotating the lever 60 of the pilot valve device 7 in a clockwise direction. Rotation of the lever 60 in this direction rotates the shaft 59 and thereby the cam 57. As the cam 57 is thus rotated the surface 58 of the cam exerts an upward pressure on the member 39 against the opposing pressure of the spring 39a and causes the member to be moved into the position in which it is shown in Figs. 5 and 6 of the drawings.

With the cam 57 thus positioned the valve 34, through the medium of the stem 38, is moved out of engagement with its seat rib 36. At the same time the spring seat 54 is moved, through the medium of stem 56, out of engagement with the ring stop 150 and through the medium of the spring 55 the spring seat first moves the valve piston 51 into engagement with the seat rib 52 and then acts to compress the spring. The valve piston 51 acting through the medium of the stem 50 moves the spring seat 48 out of engagement with the ring stop 151. Spring seat 48 acting through the medium of the spring 49 first causes the valve piston 44 to move into engagement with the seat rib 45 and then acts to compress the spring thereby positioning the various parts of the pilot valve device 7 in the position in which they are shown in Fig. 5 of the drawings. The spring 49 when compressed as just described will be of such a value that it will prevent the unseating of the valve piston 44 by a pressure in passage 42 of thirty pounds or less.

*Release of the brakes with the equipment conditioned for empty car operation*

When it is desired to effect the release of the brakes the brake pipe pressure is increased in the usual manner, causing the brake controlling valve device 2 to function to establish communication from the pipe 160 and consequently from the brake cylinder 11 to the atmosphere. The control valve device also functions to supply fluid under pressure from the brake pipe 1 to the auxiliary reservoir 4.

When the fluid under pressure is vented from the brake cylinder 11 the push rod 81 is moved into the cylinder in the usual manner thereby causing the brake cylinder levers 12 and 13 to effect a release of the brakes on the vehicle in the usual manner. When the push rod 81 has returned to the position in which the roller 147 is about to enter the right hand end of the slot 148 the levers 12 and 13 will have been moved a sufficient distance to relieve the brake shoes of braking force. From this it will be understood that the apparatus as a whole is now relieved of braking stresses. It will be understood that up to this time the operation of the lever 143 has not imparted any material operation of the toggle links and arm 60.

Now as the roller 147 traverses the right end of the slot 148 a clockwise rocking movement about pin 145 is imparted to the lever 143, the outer end of the lever acting through the medium of the rods 140 and 142 to actuate the toggle links 136 and 137 and the arm 60 to their normal positions of rest as shown in Fig. 1. The toggle links as they are thus being moved to their normal position cause the member 95 and associated rod 90 to be moved inwardly toward the brake cylinder, the rod in its movement shifting the pins 91 and 93 in the same direction along the slots 92 and 94, respectively, in the brake cylinder levers 12 and 13. The pins 91 and 93 as they are thus shifted permit the levers 12 and 13 to move so as to insure adequate clearance between the brake shoes and treads of the vehicle wheels.

The arm 60 as it is being moved actuates the several parts of the pilot valve device 7 to their normal positions of rest as shown in Fig. 5.

*Automatic change-over operation of the equipment on a partially or fully loaded vehicle*

Assuming now that the brakes on the vehicle are released, the brake pipe deplete of fluid under pressure and the vehicle in the process of being loaded. Under the influence of the weight of the lading, the vehicle body will move downwardly relative to the vehicle truck, due to the compression of the usual body supporting springs by the increasing load. Since the weighing mechanism 8 is carried by the vehicle body, the foot 75 will be moved downwardly relative to the fixed stop 76 carried by the vehicle truck, so that as the load on the vehicle is increased the clearance between the shoe 75 and the stop 76 is correspondingly increased.

Now, if the vehicle is placed in a train and fluid under pressure is supplied thereto the several chambers of the controlling valve device 2 and the auxiliary and emergency reservoir 4 and 5, respectively, will be charged in the usual manner as hereinbefore mentioned in connection with an empty vehicle. At the same time, fluid under pressure flows from the filling piece 15 through the circuit hereinbefore traced in connection with an empty vehicle to the chamber 123 of the locking mechanism 10. The increase in the pressure of fluid in chamber 123 causes movement of the piston 116 in a direction toward the left hand against the opposing action of the spring 122 to effect operation of the locking plates 106 to unlock the adjusting mechanism 9 and at the same time to establish communication through which fluid under pressure is supplied to the chambers 63 of the weighing valve devices 61 disposed one at each end of the vehicle, in identically the same manner as already described in connection with an empty vehicle.

It will be understood from the foregoing description of the functioning of the equipment on an empty vehicle that fluid under pressure supplied to chamber 63 of each weighing device 61 causes the levers 70 of each device to rock about their pivot pins until the foot 75 attached to one end thereof engages the stop 76 at each end of the vehicle. Since the clearance or travel between the foot 75 and the stop 76 is dependent upon the load carried by the vehicle, and since the cable 77 attached to the opposite end of the lever 70 is passed under the pulley 104, the pulley 104, rod 99, member 95, toggle link 136 and 137 and rod 90 of the adjusting mechanism 9 will be moved outwardly against the opposing action of the spring 103 a distance called for by the weight of the lading, the toggle links serving as the actuating medium between the rod 99 and the member 95. The rod 90 as it is being moved outwardly shifts the pins 91 and 93 in the same direction along the slots 92 and 94 in the levers 12 and 13.

Now when the pressure in the brake pipe 1 and consequently in chamber 21 of the change-over control valve device 6 has been increased to approximately thirty pounds, the change-over control valve device 6 will function as before described in connection with an empty vehicle to cause the locking mechanism to operate to lock the bar 99 and consequently the rod 90 in their adjusted position.

*Application of the brakes on a loaded or partially loaded vehicle*

When an application of the brakes is effected on the vehicle fully or partially loaded the toggle mechanism 135 operates to cause the rod 90 to move further outwardly in the slots 92 and 94 in the same manner as hereinbefore described in connection with empty vehicle braking and as before described continued movement of the push rod 81 effects operation of the brake cylinder levers 12 and 13 to cause the pull rods 83 and 88 to apply the usual brake shoes against the vehicle wheels. Since the pins 91 and 93 have been moved outwardly a greater distance than for empty braking the braking power applied to the brake shoes will be greater than that applied for empty braking.

*Release of the brakes on a partially or fully loaded vehicle*

When fluid under pressure is released from the brake cylinder 11 to effect a release of the brakes in the usual manner and when the push rod 81 has returned to within approximately three inches of its full release position the action of spring 103 will cause the arms 136 and 137 of the toggle mechanism 135 to be positioned as shown thus permitting the rod 90 to drop in the slots 92 and 94 to the adjusted position called for by the load on the vehicle; so as to provide adequate brake shoe clearance when the brakes are released.

As hereinbefore mentioned when the brakes on the vehicle are applied the various operating parts of the pilot valve device 7 will be in the position in which they are shown in Fig. 5.

*Application of the brakes upon setting a car out of a train*

In setting a car out of a train the hose couplings are parted which permits the brake pipe pressure to reduce rapidly to atmospheric pressure which rapid reduction in brake pipe pressure causes the brake controlling valve device 2, acting in the usual manner, to supply fluid under pressure from both the auxiliary and emergency reservoirs to the brake cylinder.

In effecting such an application of the brakes the variable load apparatus will function in substantially the same manner as it does when effecting a service application of the brakes with the exception that the change-over control valve device 6 operates, when the brake pipe pressure has been reduced below thirty pounds, to connect the valve chamber 21 and thereby the pipe 28 to the brake pipe by way of pipe 22.

In releasing the brakes following the application, the pilot valve device 7 functions differently than when releasing the brakes following a service application as will be seen from the following description.

When the car is again connected in a train and it is desired to effect a release of the brakes following such an application of the brakes, fluid under pressure is supplied to the brake pipe 1, in the usual well known manner, from whence it flows to the brake controlling valve device 2 and the change-over control valve device 6 in the manner hereinbefore described in connection with initial charging of the equipment.

As will be understood from the foregoing description the change-over control valve device 6 and the pilot valve device 7 will, at this time, both be positioned as illustrated in Figs. 4 and 5, respectively, thus fluid under pressure supplied to the change-over control valve device 6 flows by way of pipe 28 to chamber 27 in the pilot valve device 7. Since, as hereinbefore mentioned, spring 49 in the pilot valve 7 maintains the valve piston 44 seated against an opposing pressure of approximately 30 pounds this valve piston will remain seated with an increase in pressure in chamber 27 and connected chamber 42. However, since the spring 37 is of a low value a slight increase in the pressure of fluid in chamber 27 will cause the valve 33 to be moved out of engagement with its seat 35.

With the valve 35 thus unseated fluid under pressure supplied to chamber 27 flows past the unseated valve 35 to chamber 26 from whence it flows past unseated valve 34 to the volume reservoir 31 by way of passage 29, chamber 30 and pipe 32.

When the pressure of fluid in chamber 21 of the change-over control valve device 6 and consequently in reservoir 31 has been increased to approximately thirty pounds the change-over control valve device will function as hereinbefore described to connect pipe 28 to the atmospheric passage 158. With this communication established fluid under pressure in chamber 27 of the pilot valve device will be released to the atmosphere by way of pipe 28, cavity 157 in slide valve 24 of the change-over control valve device 6 and atmospheric passage 158.

Upon the release of fluid under pressure from chamber 27 of the pilot valve device 7, spring 37 acts to move the valve 33 into engagement with its seat 35 thereby preventing release of fluid under pressure from chamber 26 and consequently from connected volume reservoir 31.

Now when the pressure of fluid in the brake pipe 1 has been increased to a degree sufficient to effect operation of the brake controlling valve device 2 to release position which is approximately 50 pounds with the AB control valve device the brake cylinder 11 will be connected to the atmosphere in the usual manner thereby venting fluid under pressure therefrom. When this occurs the push rod 81 will move into the cylinder and thereby cause the cylinder levers 12 and 13 to effect a release of the brake on the vehicle and when the roller 147 traverses the right hand end of the slot 148 a clockwise rocking movement about pin 145 is imparted to the lever 143, the outer end of the lever acting through the medium of rods 140 and 142 to actuate the toggle links 136 and 137 and the arm 60 of the pilot valve device 7, all of which will be clear from the previous description of a release of the brakes after a service application of the brakes.

As the arm 60 of the pilot valve device 7 is thus actuated it rotates the high point 58 of the cam 57 out of engagement with the member 39 thus permitting the spring 39a to rock the member 39 about its pivot pin 39b. As the member 39 continues to rock the spring seat 54 is moved into engagement with the stop ring 150 and continued movement causes the valve piston 51 to be moved out of engagement with its seat 52 while the valve piston 44 is still maintained in seating engagement with its seat.

With the valve piston 51 unseated and the valve piston 44 seated fluid under pressure in chamber 30 and connected reservoir 31 flows to chamber 123 of the locking mechanism 10, past unseated valve piston 51, through passage 43, chamber 40 and pipe 41. Fluid under pressure thus supplied to the chamber 123 of the locking mechanism effects operation of the locking mechanism in identically the same manner as described in connection with initial charging of the equipment. That is to say, the locking mechanism 10 will function to unlock the adjusting mechanism 9 and thus permit the weighing mechanism 8 at each end of the vehicle to position the adjusting vehicle.

Now as the member 39 continues to rock about its pivot pin 39b the spring seat 48 is moved into engagement with the stop ring 151 and continued movement of the member 39 will move the valve piston 44 out of seating engagement with the seat rib 45.

When this occurs fluid under pressure in chamber 123 of the change-over control valve device 10 will be vented to the atmosphere by way of pipe 41, chamber 40, past unseated valve piston 44, chamber 42, and connected chamber 27, pipe 28, cavity 157 in the slide valve 24 of the change-over control valve device 6 and atmospheric passage 158. Since volume reservoir 31 is connected to chamber 40 at this time in the manner above described, it is also vented to the atmosphere.

Upon venting of fluid under pressure from chamber 10 of the locking mechanism 123 the spring 122 therein operates as already described to lock the adjusting mechanism in the proper position in accordance with the load on the vehicle.

The final movement of the member 39 causes the valve piston 44 to move into sealing engagement with the gasket 46 thereby cutting off communication between chambers 30 and 40 for reasons previously described in connection with initial charging.

It will be understood by those skilled in the art that it is not practicable to provide the forces needed to shift the rod 90 and its associated pins 91 and 93 while the brake is applied therefore the pilot valve device 7 and associated volume reservoir 31 are provided for the adjustment of the brake mechanism after the brake is released and according to the weight of the load carried.

*Embodiment shown in Figs. 8, 9 and 10*

In Figs. 8, 9, and 10 there is shown a different form of mechanism for locking the adjusting mechanism 9 in its adjusted position which may be substituted for the locking mechanism shown in Figs. 1 and 2. The locking mechanism is indicated by the reference numeral 200 and is similar to the mechanism shown in Fig. 1, but differs therefrom in that the locking plates 106 and the actuating lever 113 are omitted and the spring seat 117 is connected to one end of a slidably mounted member 201, which member, at its opposite end is adapted to be engaged by the stem 115 of the piston 116.

As best shown in Fig. 10 of the accompanying drawings the member 201 is provided with a recess 204 in which there is disposed a gear wheel 205 provided with teeth arranged to engage locking teeth on the member 201. The gear wheel 205 is mounted on a shaft 206 which is journaled in the casing of the mechanism. One end of this shaft extends to the exterior of the casing and has mounted thereon a pinion gear 207 arranged to engage rack teeth provided on the end of the rod 99.

As will be understood from the description of the apparatus illustrated in Fig. 1, fluid under pressure supplied to pipe 41 effects operation of the piston 115 in a direction toward the left hand. Movement of the piston in this direction causes the piston stem 115 to engage the member 201 and continued movement of the piston and stem moves the member 201 in the same direction against the opposing pressure of the spring 122, thus moving the teeth on the member out of engagement with the teeth on the gear wheel 205.

When the member 201 is moved out of engagement with the gear wheel 205 any change in the load on the vehicle will as hereinbefore described cause the rod 99 to either move inwardly or outwardly depending on whether the load on the vehicle is increased or decreased. Since the tooth portion of the rod 99 is in engagement with the pinion gear 207 movement either outwardly or inwardly of the rod effects rotation of the pinion thereby the gear 205.

Now when the change-over control valve device 6, operates as described in connection with the first embodiment of the invention to release fluid under pressure from the pipe 41, the spring 122 will act to move the tooth portion of the member 201 into engagement with the teeth on the gear wheel 205 and thus lock the rod 99 in the adjusted position.

*Description of the embodiment shown in Fig. 11*

In Fig. 11 there is illustrated another form of the invention shown in Fig. 1 in which a rod and lever weighing mechanism is substituted for the cable and pulley weighing mechanism disclosed in Fig. 1. In addition to the rod and lever weighing mechanism, a locking mechanism different from that shown in Fig. 1 or Figs. 8, 9, and 10 is substituted and the toggle mechanism 135 is omitted. For simplicity, corresponding parts and pipes of the two embodiments will be designated by the same reference numerals without further description and only those parts provided in Fig. 11, which are not provided in the previous embodiments will be described briefly in connection with the basic parts of the equipment.

As shown in Fig. 11 of the drawings the live cylinder lever 12 is provided with an extension 302 arranged to carry a roller 307 which is guided in a guide slot 324 which corresponds to the guide slot 145b in the apparatus of Fig. 1.

In this embodiment of the invention an adjusting mechanism 300 is provided for shifting the rod 90. This mechanism comprises a shifting member 301 in which the rod 90 is slidably mounted for longitudinal movement. The shifting member 301 is provided with a horizontally extending arm 303, which extends through and is slidably guided in the fixed casing of a locking mechanism 304 and at its outer end is connected to one end of a link 305 by means of a pin 306.

Interposed between and operatively engaging the outer wall of the casing for the locking mechanism 304 and the shifting member 301 is a spring 308.

The locking mechanism 304 comprises a piston 309 having a stem 310 which is slidably mounted in the casing. This stem is provided with a slot or opening 311 through which the outer end portion of the arm 303 passes. This portion of the arm is provided with locking teeth adapted to engage locking teeth provided on the stem 310. Engaging the end of the stem 310 and the inner wall of the casing is a spring 312 which tends, at all times, to urge the teeth on the stem into locking engagement with the teeth on the arm 303.

At one side of the piston 309 is a chamber 313 which is in constant open communication with the atmosphere through a passage 314. This chamber is also connected by way of passage and pipe 315 to the pipe 64 which extends from the weighing device at one end of the vehicle to the weighing device at the opposite end of the vehicle.

At the opposite side of the piston there is a chamber 316 which is in constant open communication with the pipe 28 leading to the seat for the slide valve 24 in the change-over control valve device 6. This chamber is also connected by way of a restricted passage 317 past a ball check valve 318 in passage 317 and through pipe 319 to the pipe 64.

As hereinbefore mentioned the outer end of the arm 303 is connected to one end of a link 305 which link at its opposite end is connected to an arm 321 of a three armed bell crank lever 320. The bell crank lever 320, as well as the brake cylinder 11, the locking mechanism 304 and brake cylinder levers 12 and 13 are mounted on a movable part of the vehicle, such for instance as the vehicle body.

The bell crank is pivotally mounted and is provided with arms 322 and 323 in addition to arm 321.

The arm 323 is connected to one end of a link 327, while the arm 322 is connected to one end of a rod 325. The link 327 is connected at its opposite end to an arm 328 of a bell crank lever 329, which is pivotally mounted on the vehicle body. The other arm 330 of the bell crank lever 329 is connected to one end of a rod 331, which rod in turn is connected at its opposite end to one end of a lever 332, which is pivotally mounted on the casing of a weighing device 333 disposed at one end of the vehicle and fixed to the vehicle body.

The lever 332 is operatively connected to one end of a push rod 340, which push rod is also operatively connected to one arm of a bell crank 341 pivotally connected to the casing of the weighing device 333 by means of a pin 344. The other arm of the bell crank is connected to one end of a rod 342. The rod 342 is provided at its opposite end with a foot 75 which is adapted to be moved into engagement with the stop 76 mounted on the vehicle truck frame for the purpose hereinbefore described in connection with the embodiment shown in Fig. 1 of the drawings.

Contained within the casing of the weighing device 333 there is a movable abutment which may be in the form of a diaphragm, not shown, which is adapted to actuate the push rod 340 in a direction away from the casing to cause movement of the rod 331 in the opposite direction, and to at the same time cause the bell crank lever 341 to rock about the pivot pin 344, upon the supply of fluid under pressure through pipe 64.

The rod 325 extends to the opposite end of the vehicle and is operatively connected in identically the same manner as just described in connection with rod 331, to a weighing device 333, not shown, to effect movement of the rod 325 in a direction toward the left hand when fluid under pressure is supplied to the weighing device at this end of the vehicle.

From the foregoing description in connection with the first embodiment of the invention it will be understood that in initially charging the apparatus fluid under pressure will be supplied from the brake pipe to the pipe 22, through the circuit traced in connection with the first embodiment. Fluid under pressure thus supplied to pipe 22 flows therefrom through the change-over control valve device 6, to pipe 28. Fluid under pressure thus supplied to pipe 28 flows therefrom to chamber 316 in the locking mechanism 304 and from this chamber, it flows through the restricted passage 317 to the chamber 313 at the opposite side of the piston by way of pipes 319 and 64 and pipe and passage 315. Fluid under pressure thus supplied to pipe 64 flows to the weighing devices 333 at the ends of the vehicle for a purpose hereinafter described.

Fluid under pressure acting in chamber 316 causes the piston 309 and thereby the stem 310 to move, in a direction toward the left hand as viewed in Fig. 11, against the opposing pressure of the spring 312. Movement of the stem 310 in this direction causes the teeth carried thereby to be moved out of engagement with the teeth on the arm 303 to thereby unlock the arm 303.

Continued movement of the piston 309 in this direction causes the piston to engage a stop 355 provided on the casing. With the piston in engagement with stop 355, fluid under pressure in chamber 316 is connected to the weighing devices at each end of the vehicle by way of the relatively unrestricted passage and pipe 315 and pipe 64.

It should here be mentioned that the supply of fluid under pressure to the weighing device at the restricted rate is for the purpose of providing a cushion pressure in the cylinder of the weighing devices in case the adjusting mechanism is in load position when the mechanism is unlocked in the manner just described.

Fluid under pressure supplied to the weighing device 333 at each end of the vehicle causes the push rod 340 in each device to move in a direction away from the casing thus causing the lever 332 at each end of the vehicle to rock about its pivot and at the same time causes the bell crank lever 341 to rock about its pivot pin 344. The lever 332 and the bell crank lever 341 will continue to rock about their pivot pins until they are brought to a stop by the foot 75 engaging the stop 76. Since the rod 325 moves to the left and the rod 331 moves to the right upon rocking action of the lever 332 at each end of the vehicle, these levers both act to rotate the bell crank lever 320 in a counter-clockwise direction about a pivot pin 346. It will be seen from an inspection of the drawings that the movement of the rod 325 is transmitted directly to the bell crank lever 320 while the movement of the rod 331 is transmitted to the bellcrank lever 320 through the medium of bell crank lever 330 and link 327.

Since as hereinbefore described in connection with Fig. 1 the clearance or travel between foot 75 and the stop 76 is dependent on the load carried by the vehicle, the degree the bell crank lever 320 will be rotated in a clockwise direction as just described will also be dependent on the load carried by the vehicle.

The counter-clockwise rotation of the bell crank 320 acts through the medium of the link 305 to move the arm 303 and thereby the member 301 outwardly against the opposing action of the spring 308 to the degree suitable for the load carried by the vehicle. As the member 301 is thus moved outwardly the rod 90 carried thereby is also moved in the same direction to position the pins 91 and 93 in the slots 92 and 94.

Now, as in the previous embodiment, when the pressure in the brake pipe 1 and consequently in chamber 21 of the change-over control valve device 6 has been increased to approximately thirty pounds, the change-over control valve device 6 will function to release fluid under pressure from the chamber 316 in the locking mechanism 304 to the atmosphere. When the pressure in chamber 316 and acting on piston 309 has been reduced below the force of the spring 312 said spring will act to move the piston and stem 310 in a direction toward the right hand. Movement of the piston in this direction closes the passage 315 temporarily thereby permitting the small volume in chamber 316 to reduce rapidly to atmospheric pressure. It will be noted that the ball check valve 318 acts at this time to prevent back flow of fluid under pressure from pipe 64 to the chamber 316.

Continued movement of the piston in the same direction causes the teeth on the stem 310 to engage the teeth on the arm 303 and thereby lock the arm 303, member 301 and rod 90 and pins 91 and 93 in an adjusted position. At the same time as the piston moves in this direction it uncovers the passage 315 thus connecting passage 315 to chamber 313. When this occurs fluid under pressure in the weighing devices 333 is vented to the atmosphere by way of pipe 64, passage and pipe 315, chamber 313 and passage 314.

It should here be noted that if the load on the vehicle is equally distributed on the two trucks the clearance between the shoe 75 and the stop 76 at each end of the vehicle will be equal and the rod 90 will be positioned to produce the brake force desired for this load. If, however, the load is unequally distributed the brake force increase in this embodiment of the invention will be governed by the end of the vehicle having the lowest weight or load but will be increased above what it would be for an empty vehicle.

When it is desired to effect an application of the brakes fluid under pressure will be supplied to the brake cylinder 11 by way of pipe 160 in the manner previously described in connection with the first embodiment of the invention. Fluid under pressure supplied to the brake cylinder 11 will cause the piston push rod 81 to effect operation of the brake cylinder levers 12 and 13 to cause the pull rods 83 and 88 to apply the brakes.

It should here be mentioned that the supply of fluid under pressure to the weighing devices at the restricted rate is for the purpose of providing a cushion pressure in the cylinder of the weighing devices in case the adjusting mechanism is in load position when the mechanism is unlocked which is accomplished in a manner which will now be described.

When the rod 90 is positioned for braking on a loaded vehicle it will be moved from the position in which it is shown in Fig. 11 to a position nearer the locking mechanism 304, in the manner above described, thus spring 308 will at this time be under considerable compression.

If under these conditions the brake pipe pressure is reduced to below thirty pounds, as by effecting an emergency application of the brakes, the change-over control valve device 6 will assume its initial charging position, as will be understood from the previous description.

When the pressure in the brake pipe is increased to recharge the equipment and effect a release of the brakes following such an application, fluid supplied to the brake pipe flows by way of the change-over control valve device 6 to the unlocking mechanism 304, which fluid flows at a restricted rate to the weighing device 333 at each end of the vehicle and builds up a slight pressure therein before the unlocking mechanism operates to unlock the adjusting mechanism 300. Now when the unlocking mechanism does function to unlock the arm 303 of the adjusting mechanism 300, the slight pressure in the weighing devices operates through the associated lever mechanism to gradually move the shoe 75 into engagement with the stop 76 thus preventing any damage to either the shoe or the stop. At the same time this action of the weighing mechanism will oppose action of the spring 308 to force the arm 303, member 301 and associated rod 90 and pins 91 and 92 in a direction toward the brake cylinder 11, as will be clear from the foregoing description, thus preventing any undue strains or stresses in the adjusting mechanism.

Having now described my invention what I claim as new and desire to secure by Letters Patent, is:

1. In a variable load brake apparatus for a vehicle, in combination, a brake lever, means for actuating said lever, an adjustable fulcrum for said lever, said fulcrum having a position for providing empty vehicle braking and being movable therefrom to various other positions through a loaded vehicle zone, for providing loaded vehicle braking, means movable by fluid pressure and according to the weight of the load carried for positioning said fulcrum in said loaded vehicle zone, locking means normally locking said fulcrum in position, fluid pressure controlled means having a chamber normally connected to the atmosphere, said means being operative upon an increase in fluid under pressure in said chamber to first unlock said fulcrum and then supply fluid under pressure to the second mentioned means to effect the positioning of said fulcrum and operative upon a decrease in fluid under pressure in said chamber to effect operation of said locking means to lock said fulcrum in the selected position and to then release fluid under pressure from the first mentioned means.

2. In a variable load brake apparatus for a vehicle, in combination, a brake lever, means for actuating said lever, an adjustable fulcrum for said lever, said fulcrum having a position for providing empty vehicle braking and being movable therefrom to various other positions through a loaded vehicle zone for providing loaded vehicle braking, means movable by fluid pressure and according to the weight of the load carried for positioning said fulcrum in said loaded vehicle zone, locking means for locking said fulcrum in any selected position, a brake pipe normally deplete of fluid under pressure adapted to be charged with fluid under pressure for control of the brakes on the vehicle, means operative upon a predetermined increase in brake pipe pressure to effect operation of the locking means to unlock said fulcrum and supply fluid under pressure to the second mentioned means, and means operative upon a predetermined greater increase in brake pipe pressure for effecting the operation of the locking means to again lock the fulcrum against movement and to release fluid under pressure from the second mentioned means.

3. In a variable load brake apparatus for a vehicle, in combination, a brake lever operatively connected at one end to a brake rigging element to be operated, a brake cylinder connected to the other end of said lever and operative to actuate the lever and thereby said element, a slotted opening in said lever extending longitudinally of the lever intermediate its ends, a fulcrum element for said lever disposed in said slotted opening, means movable by fluid pressure and according to the weight of the load carried for shifting said fulcrum element along the lever, a brake pipe adapted to be charged with fluid to a certain predetermined pressure, and valve means responsive to the pressure of fluid in the brake pipe before said predetermined pressure is attained for supplying fluid under pressure to said means.

4. In a variable load brake apparatus for a vehicle, in combination, a brake lever operatively connected at one end to a brake rigging element to be operated, a brake cylinder connected to the other end of said lever and operative to actuate the lever and thereby said element, a slotted opening in said lever extending longitudinally of the lever intermediate its ends, a fulcrum element for said lever disposed in said slotted opening, means movable by fluid pressure and according to the weight of the load carried for shifting said fulcrum element along the lever, a brake pipe adapted to be charged with fluid to a certain predetermined pressure, a locking means for locking the fulcrum in any selected position along the lever, a movable abutment operative by fluid under pressure from the brake pipe for actuating said locking means to unlock the fulcrum and operative upon the release of fluid under pressure therefrom for effecting the operation of the locking means to lock the fulcrum and means normally establishing communication through which fluid under pressure is supplied from the brake pipe to effect the operation of said abutment and operative before said certain predetermined pressure is attained in the brake pipe for releasing fluid under pressure acting on said movable abutment.

5. In a variable load apparatus for a vehicle, in combination, a brake lever, a brake cylinder operatively connected to said lever, an adjustable fulcrum for said lever, said fulcrum having a brake controlling position for an empty vehicle and being movable therefrom to various other brake controlling positions through a loaded vehicle zone, means movable by fluid under pressure and according to the weight of the load carried for selectively moving said fulcrum to the appropriate one of said other control positions, and a lever mechanism operatively associated with said brake cylinder for also moving said fulcrum, said lever mechanism being operative as an incident to the operation of said brake cylinder for actuating said brake lever.

6. In a variable load apparatus for a vehicle, in combination, a brake lever, a brake cylinder operatively connected to said lever, an adjustable fulcrum for said lever, said fulcrum having a brake controlling position for an empty vehicle and being movable therefrom to various other brake controlling positions through a loaded vehicle zone, means movable by fluid under pressure and according to the weight of the load carried for selectively moving said fulcrum to the appropriate one of said other control positions, a toggle mechanism operatively connected to said fulcrum for moving said fulcrum, and a lever mechanism operatively connecting said brake cylinder and toggle mechanism, said lever mechanism being operative upon operation of said brake cylinder to actuate said brake cylinder lever to effect operation of said toggle mechanism.

7. In a variable load apparatus for a vehicle, in combination, a brake cylinder lever, a brake cylinder operatively connected to said lever, an adjustable fulcrum for said lever comprising a fulcrum pin and a pin carrying element, said pin and carrying element having a brake controlling position for an empty vehicle and being movable therefrom to various other brake controlling positions through a loaded vehicle zone, a member operatively connected to said carrying element for moving said element and thereby said pin to one of said other brake controlling positions, fluid pressure responsive means operative upon the supply of fluid under pressure thereto for moving said member, and locking means comprising a plurality of slidable plates adapted to engage said member to lock said member and thereby said carrying means and said pin in any selected control position.

8. In a variable load apparatus for a vehicle, in combination, a brake cylinder lever, a brake cylinder operatively connected to said lever, an adjustable fulcrum for said lever comprising a fulcrum pin and a pin carrying element, said pin and carrying element having a brake controlling position for an empty vehicle and being movable therefrom to various other brake controlling positions through a loaded vehicle zone, a member operatively connected to said carrying element for moving said element and thereby said pin to one of said other brake controlling positions, fluid pressure responsive means operative upon the supply of fluid under pressure thereto for moving said member, locking means normally locking said member against movement, said locking means comprising a plurality of movable plates and spring means for moving said plates into locking engagement with said member, and a movable abutment responsive to an increase in fluid under pressure for effecting movement of said plates out of engagement with said member to unlock said member and at the same time to open a communication through which fluid under pressure may be supplied to said fluid pressure responsive means.

9. In a variable load apparatus for a vehicle, in combination, a brake cylinder lever, a brake cylinder operatively connected to said lever, an adjustable fulcrum for said lever comprising a fulcrum pin and a pin carrying element, said pin and carrying element having a brake controlling position for an empty vehicle and being movable therefrom to various other brake controlling positions through a loaded vehicle zone, a member operatively connected to said carrying element for moving said element and thereby said pin to one of said other brake controlling positions, fluid pressure responsive means operative upon the supply of fluid under pressure thereto for moving said member, and locking means normally locking said member against movement, said locking means comprising a toothed wheel adapted to be driven by said member a slidable member adapted to engage said wheel and spring means for moving said slidable member into locking engagement with said wheel to lock said member and thereby said carrying means and said pin in any selected brake controlling position.

10. In a variable load apparatus for a vehicle in combination, a brake cylinder lever, a brake cylinder operatively connected to said lever, an adjustable fulcrum for said lever comprising a fulcrum pin and a pin carrying element, said pin and carrying element having a brake controlling position for an empty vehicle and being movable therefrom to various other brake controlling positions through a loaded vehicle zone, a member operatively connected to said carrying element for moving said element and thereby said pin to one of said other brake controlling positions, said member having adjacent one end thereof a toothed portion, fluid pressure responsive means operative upon the supply of fluid under pressure thereto for moving said member, a toothed wheel, a pinion gear having operative engagement with the toothed portion of said member for driving said toothed wheel, a lock member adapted to engage said toothed wheel for locking said wheel and thereby said pinion and member in any selected brake controlling position, and means for effecting movement of said lock into or out of engagement with said toothed wheel.

11. In a variable load brake apparatus for a vehicle, in combination, a brake cylinder, a pair of brake cylinder levers, a rod operatively connecting said levers, said rod being movable longitudinally of the levers to vary the braking ratio of the levers, fluid pressure responsive means operative in accordance with the weight of the load on the vehicle for actuating said rod to provide the appropriate lever ratio for the weight of the load carried, and valve means operative automatically as an incident to coupling the vehicle in a train for supplying fluid under pressure to said means.

12. In a variable load brake apparatus for a vehicle, in combination, a brake cylinder, a pair of brake cylinder levers, a rod operatively connecting said levers, said rod being movable longitudinally of the levers to vary the braking ratio of the levers, and fluid pressure responsive means including a fluid pressure operated motor disposed at each end of the vehicle for actuating said rod longitudinally of the levers to a position in accordance with the load carried by the vehicle.

13. In a variable load brake apparatus for a vehicle, in combination, a brake cylinder, a pair of brake cylinder levers, a rod operatively connecting said levers, said rod being movable longitudinally of the levers to vary the braking ratio of the levers, means including a fluid pressure operated motor disposed at each end of the vehicle for actuating said rod longitudinally of the levers to a position in accordance with the load carried by the vehicle, and locking means for locking said rod in any adjusted position.

14. In a variable load brake apparatus for a vehicle, in combination, a brake cylinder, a pair of brake cylinder levers, a rod operatively connecting said levers, said rod being movable longitudinally of the levers to vary the braking ratio of the levers, means including a fluid pressure operated motor disposed at each end of the vehicle for actuating said rod longitudinally of the levers to a position in accordance with the load carried by the vehicle, locking means normally locking said rod against movement, and fluid pressure valve means operative when the pressure of fluid supplied thereto is below a predetermined degree to effect operation of the locking means to unlock said rod and at the same time supply fluid to the fluid pressure operated motor at each end of the vehicle and operative when the pressure of fluid supplied thereto is above a predetermined degree to effect operation of said locking means to again lock said rod and to release fluid under pressure from said fluid pressure operated motor at each end of the vehicle.

15. In a variable load brake apparatus for a vehicle, in combination, a brake cylinder, a pair of brake cylinder levers, a rod operatively connecting said levers, said rod being movable longitudinally of the levers to vary the leverage ratio, a lever mechanism operatively connecting said rod and said brake cylinder, operative upon operation of said brake cylinder to effect an application of the brakes for actuating said rod to a position relative to the length of said levers to take up slack, fluid pressure responsive means operative upon the supply of fluid under pressure thereto for also actuating said rod to a position relative to the length of said levers in accordance with the load carried by the vehicle, and valve means automatically operative upon operation of said brake cylinder to effect a release of the brakes for supplying fluid under pressure to said fluid pressure responsive means.

16. In a variable load brake apparatus for a vehicle in combination, a brake cylinder, a pair of brake cylinder levers, a rod operatively connecting said levers, said rod being movable longitudinally of the levers to vary the leverage ratio, a lever mechanism operatively connecting said rod and said brake cylinder, operative upon operation of said brake cylinder to effect an application of the brakes for actuating said rod to a position relative to the length of said levers to take up slack, fluid pressure responsive means operative upon the supply of fluid under pressure thereto for also actuating said rod to a position relative to the length of said levers in accordance with the load carried by the vehicle, a reservoir normally charged with fluid under pressure, and valve means automatically operative upon operation of said brake cylinder to effect a release of the brakes for supplying fluid under pressure from said reservoir to said fluid pressure responsive means.

17. In a variable load brake for a vehicle comprising a lever mechanism operative to apply and release the brakes, a brake cylinder for controlling the operation of said lever mechanism, adjusting apparatus operative according to variations in the weight of the load carried by the vehicle to condition said mechanism for empty braking or load braking, and slack controlling means carried by said adjusting apparatus and operative upon the operation of said brake cylinder in applying the brakes to actuate said lever mechanism to take up slack due to brake shoe clearance and operative upon operation of the brake cylinder in releasing the brakes to provide slack and thereby said brake shoe clearance.

18. In a variable load brake for a vehicle comprising a lever mechanism operative to apply and release the brakes, a brake cylinder for controlling the operation of said lever mechanism, adjusting apparatus operative according to variations in the weight of the load carried by the vehicle to condition said mechanism for empty braking or load braking, a toggle carried by said adjusting apparatus operative to control slack in the lever mechanism due to brake shoe clearance, a fixed member having a guide opening formed therein, and a lever for actuating said toggle, said lever being operatively connected to said brake cylinder and having a fulcrum movable in said guide opening, the fulcrum and wall of the opening cooperating to rock said lever to actuate the toggle upon the operation of said brake cylinder.

19. In a variable load brake for a vehicle comprising a lever mechanism operative to apply and release the brakes, a brake cylinder for controlling the operation of said lever mechanism, adjusting apparatus operative according to variations in the weight of the load carried by the vehicle to condition said mechanism for empty braking or load braking, a toggle carried by said adjusting apparatus operative to control slack in the lever mechanism due to brake shoe clearance, a fixed member having a guide opening formed therein, and a lever for actuating said toggle, said lever being operatively connected to said brake cylinder and having a fulcrum movable in said guide opening, the fulcrum and wall of the opening cooperating to rock said lever to actuate the toggle upon the operation of said brake cylinder, over a portion of its operating zone and cooperating through the remainder of the operating zone of the brake cylinder to hold the toggle in the position to which it has been operated without effecting any material rocking movement of the lever.

20. In a variable load fluid pressure brake system for a vehicle the combination with a brake pipe, a brake cylinder and a brake rigging operative to effect an application and the release of the brakes of means movable according to variations in the weight of the lading carried by the vehicle for varying the braking power of said brake rigging, fluid pressure responsive means operative upon a reduction in the pressure of fluid acting thereon to lock said means in any position to which it has been moved, and operative upon an increase in the pressure of fluid acting thereon, to unlock said means, valve means normally establishing communication through which fluid under pressure may flow from said brake pipe to said fluid pressure responsive means to effect the unlocking operation of the fluid pressure responsive means, said valve means being operative upon a predetermined increase in brake pipe pressure for closing said communication, and a valve device operative upon the operation of said brake rigging to effect an application of the brakes to render said valve means ineffective to control the flow of fluid under pressure to and from said pressure responsive means and operative upon the operation of said brake rigging in effecting a subsequent release of the brakes to supply fluid under pressure from a source other than said brake pipe to said fluid pressure responsive means.

21. In a variable load fluid pressure brake system for a vehicle: the combination with a brake pipe, a brake cylinder and a brake rigging operative to effect an application and the release of the brakes, of means movable according to variations in the weight of the lading carried by the vehicle for varying the braking power of said brake rigging, fluid pressure responsive means operative upon a reduction in the pressure of fluid acting thereon to lock said means in any position to which it has been moved and operative upon an increase in the pressure of fluid acting thereon to unlock said means, valve means normally establishing communication through which fluid under pressure may flow from said brake pipe to said fluid pressure responsive means to effect the unlocking operation of the fluid pressure responsive means, said valve means being operative upon a predetermined increase in brake pipe pressure for closing said communication, a reservoir adapted to be charged with fluid under pressure, and a valve device operative upon operation of said brake rigging to effect an application of the brakes to render said valve means ineffective to control the flow of fluid under pressure to and from said pressure responsive means and operative upon the operation of said brake rigging in effecting a subsequent release of the brakes to supply fluid under pressure from said reservoir to said fluid pressure responsive means.

22. In a variable load fluid pressure brake system for a vehicle the combination with a brake pipe, a brake cylinder and a brake rigging operative to effect an application and the release of the brakes, of means movable according to variations in the weight of the lading carried by the vehicle for varying the braking power of said brake rigging, fluid pressure responsive means operative upon a reduction in the pressure of fluid acting thereon to lock said means in any position to which it has been moved and operative upon an increase in the pressure of fluid acting thereon, to unlock said means, valve means normally establishing communication through which fluid under pressure may flow from said brake pipe to said fluid pressure responsive means to effect the unlocking operation of the fluid pressure responsive means, said valve means being operative upon a predetermined increase in brake pipe pressure for closing said communication, a reservoir normally deplete of fluid under pressure, a valve device operative upon the operation of said brake rigging to effect an application of the brakes to cut off communication through which fluid under pressure may flow from the brake pipe to said fluid pressure responsive means when said valve means is in its normal position and to establish communication through which fluid under pressure may flow from said brake pipe to said reservoir and operative upon the operation of said brake rigging in effecting a subsequent release of the brakes after operation of said valve means by said predetermined increase in brake pipe pressure to supply fluid under pressure from said reservoir to said pressure responsive means.

23. In a variable load fluid pressure brake system for a vehicle the combination with a brake pipe, a brake cylinder and a brake rigging operative to effect an application and the release of the brakes of means movable according to variations in the weight of the lading carried by the vehicle for varying the braking power of said brake rigging, fluid pressure responsive means operative upon a reduction in the pressure of fluid acting thereon to lock said means in any position to which it has been moved and operative upon an increase in the pressure of fluid acting thereon to unlock said means, valve means normally establishing communication through which fluid under pressure may flow from said brake pipe to said fluid pressure responsive means to effect the unlocking operation of the fluid pressure responsive means, said valve means being operative upon a predetermined increase in the brake pipe pressure for closing said communication, a reservoir normally deplete of fluid under pressure, a valve device having an application position and a release position said valve device being movable from said release position to said application position upon the operation of said brake rigging to effect an application of the brakes to render said valve means ineffective to control the flow of fluid under pressure to and from said pressure responsive means and to render said valve means effective to establish a communication through which fluid under pressure may flow from said brake pipe to said reservoir for charging same and movable from said application position to said release position upon the operation of said brake rigging to effect a subsequent release of the brakes to supply fluid under pressure from said reservoir to said pressure responsive means.

24. In a variable load fluid pressure brake system for a vehicle the combination with a brake pipe, a brake cylinder, a brake rigging operative to effect an application and the release of the brakes, of means movable according to variations in the weight of the lading carried by the vehicle for varying the braking power of said brake rigging spring means for locking said means in any position to which it has been moved, fluid pressure responsive means operative upon a reduction in the pressure of fluid acting thereon to effect operation of said spring means to lock said means and operative upon an increase in the pressure of fluid acting thereon to effect operation of said spring means to unlock said means, a valve having one position for establishing communication through which fluid under pressure may flow from said brake pipe to said fluid pressure responsive means and having another position for cutting off communication from the brake pipe to said fluid pressure responsive means and establishing communication through which fluid in said fluid pressure responsive means is vented to the atmosphere, means responsive to the pressure of fluid in said brake pipe for controlling said valve and normally operative to maintain said valve in said one position and operative upon a predetermined increase in brake pipe for moving said valve to said other position, a valve device interposed between said valve and said fluid pressure responsive means operative upon the operation of said brake rigging to effect an application of the brakes to render said valve ineffective to control the flow of fluid under pressure to and from said pressure responsive means and operative upon the operation of said brake rigging in effecting a subsequent release of the brakes to supply fluid under pressure from a source other than said brake pipe to said fluid pressure responsive means.

25. In a variable load brake for a vehicle comprising a lever mechanism operative to apply and release the brakes; a brake cylinder for controlling the operation of said lever mechanism, said brake cylinder being operative upon a supply of fluid under pressure thereto for effecting operation of the lever mechanism to apply the brakes and upon a release of fluid under pressure therefrom to effect operation of the lever mechanism to release the brakes; adjusting apparatus operative according to variations in the weight of the load carried by the vehicle to condition said mechanism for empty braking or load braking; means for locking said adjusting apparatus against operation when the brakes are applied, said means including a locking mechanism responsive to an increase in fluid pressure thereon for unlocking the adjusting apparatus and operative upon a decrease in fluid pressure thereon for locking said adjusting apparatus, a reservoir normally deplete of fluid under pressure, a valve mechanism provided with a first passage through which fluid under pressure is adapted to be supplied to the interior thereof, a second passage through which fluid under pressure is adapted to be supplied from the interior of the valve mechanism to and released from said reservior, a third passage through which fluid under pressure is adapted to be supplied from the interior of the valve mechanism to and release from the locking mechanism and being operative by the brake cylinder as the brake cylinder moves to application position to establish communication between said first and said second passages and operative by the brake cylinder as the brake cylinder moves to release position to first establish communication between said second and third passages and then between said first, second and third passages; a brake pipe normally charged with fluid under pressure to a predetermined degree; and a valve device responsive to the pressure of fluid in the brake pipe and operative when the brake pipe pressure is a certain degree below said predetermined degree for establishing communication through which fluid may flow from said brake pipe to said first passage and operative upon an increase above said certain pressure for connecting said first passage to the atmosphere.

CLYDE C. FARMER.